(12) United States Patent
Wu

(10) Patent No.: US 8,208,760 B2
(45) Date of Patent: Jun. 26, 2012

(54) IMAGE RESOLUTION ADJUSTMENT METHOD

(75) Inventor: Kuan-Yi Wu, Tainan County (TW)

(73) Assignee: Chi Lin Technology Co., Ltd, Tainan County (TW)

( * ) Notice: Subject to any disclaimer, the term of this patent is extended or adjusted under 35 U.S.C. 154(b) by 855 days.

(21) Appl. No.: 12/340,792

(22) Filed: Dec. 22, 2008

(65) Prior Publication Data

US 2010/0002958 A1 Jan. 7, 2010

(30) Foreign Application Priority Data

Jul. 3, 2008 (TW) ................ 97125041 A

(51) Int. Cl.
*G06K 9/32* (2006.01)
*H04N 7/01* (2006.01)
(52) U.S. Cl. .................... 382/299; 348/441; 348/581
(58) Field of Classification Search ............... 382/299; 348/441, 581
See application file for complete search history.

(56) References Cited

U.S. PATENT DOCUMENTS

| | | | |
|---|---|---|---|
| 5,237,432 A * | 8/1993 | Calarco et al. | 358/451 |
| 5,394,485 A * | 2/1995 | Lowe et al. | 382/254 |
| 5,650,858 A * | 7/1997 | Lund | 358/3.15 |
| 6,587,602 B2 | 7/2003 | Wakisawa et al. | |
| 6,714,688 B1 * | 3/2004 | Gallagher et al. | 382/266 |
| 7,199,837 B2 | 4/2007 | Callway et al. | |
| 7,876,979 B2 * | 1/2011 | Lee et al. | 382/300 |
| 8,139,091 B2 * | 3/2012 | Wu | 345/698 |

* cited by examiner

*Primary Examiner* — Jason M Repko
*Assistant Examiner* — Patrick Edwards
(74) *Attorney, Agent, or Firm* — Ming Chow; Sinorica, LLC

(57) ABSTRACT

There is disclosed an image resolution adjustment method comprising the steps of: performing a predetermined selection rule to select one of scaling modes based on a source resolution Vi and a display resolution Vo to generate a scaling value set for outputting a scaled image; and determining whether a smoothing process to determine whether or not the scaled image is smoothed based on application requirements, wherein the scaling modes comprises a first scaling mode, a second scaling mode and a third scaling mode to generate each of the corresponding scaling value set, respectively. The scaling value set is provided to generate replicated pixels or lines for each pixel or line of the source image during a horizontal or vertical scaling period, and the replicated pixels or lines are arranged in horizontal or vertical symmetry in relation to its central region of the source image.

10 Claims, 12 Drawing Sheets

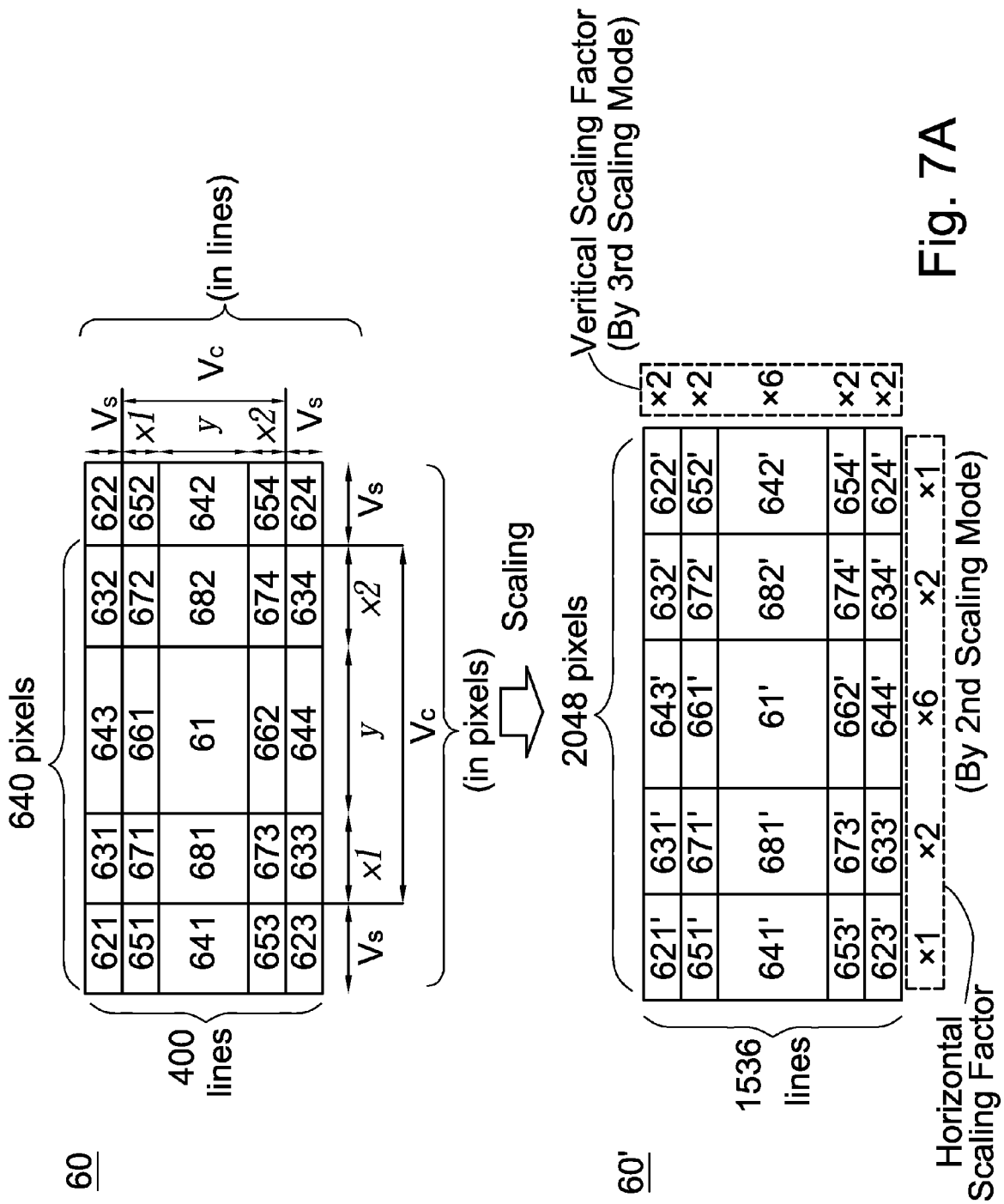

IMAGE RESOLUTION ADJUSTMENT METHOD

BACKGROUND OF THE INVENTION

1. Field of the Invention

The invention relates to an image resolution conversion technique and more particularly to an image resolution conversion method performed in a scaling phase and a smoothing phase.

2. Description of the Related Art

This application claims the benefit of Taiwan Application No. 97125041 entitled "IMAGE RESOLUTION ADJUSTING DEVICES, DISPLAY DEVICES AND IMAGE RESOLUTION ADJUSTING METHODS" filed on Jul. 3, 2008. The disclosure of the Taiwan Application is incorporated herein.

For current display devices, electronic monitor systems are widely applied in various applications, such as digital cameras, liquid crystal display (LCD) devices, and LCD televisions. In order to conform to specifications of electronic monitor systems with different resolutions, the resolutions of image sources have to be controlled by scaling images. For example, when a resolution of an input image is in VGA mode (640×480) while an output device is in XGA mode (1024×768), the resolution of the input image has to be enhanced, and when a resolution of an input image is in SXGA mode (1280×1024) while an output device is in XGA mode (1024×768), the resolution of the input image is degraded.

Conventional image scaling control techniques usually use resolution (i.e. pixel or line of an image) interpolation or replication during an image upscaling period. An image which is upscaled by interpolation advantageously has smooth edges from the perspective of human vision; however, the content of the original image is changed so as to result in image degration for its accuracy. When an image is upscaled by replication, disadvantageously, the image has sawtooth edges if the scaling ratio for the image is not controlled appropriately, resulting in degraded quality of the image.

Please referred to FIG. 1, U.S. Pat. No. 6,587,602 discloses a resolution conversion method. It is a process for converting an original digital image into another digital image having a different number of pixels. In this prior art, the original image is converted into an enlarged image by generating pixels to be interpolated to increase the number of pixels. Besides, a function f1 links the gray scale levels of adjacent pixels so as to generate interpolation pixels such that the gray scale levels thereof are positioned on the function f1. On the other hand, if the difference between the gray scale levels of the adjacent pixels is greater than the predetermined difference threshold, a function f2 links the gray scale levels of adjacent pixels so as to generate interpolation pixels such that the gray scale levels thereof are positioned on the function f2. However, the prior art uses interpolation to provide the resolution conversion so as to cause original pixel data change from the source image unfortunately, and it is not appropriate in some cases of the emergent medical surgery because this situation does not allow any change of original pixel data to prevent any of the medical mistakes from viewing the original medical images.

Besides, U.S. Pat. No. 7,199,837 also discloses a system for improving a ratiometric expansion. The prior art provides, after an image being enlarged by a replicator, the resolution of the image re-adjusted by a re-sampler. However, the prior art is trouble with disadvantageously complicating image scaling calculation and smoothness.

BRIEF SUMMARY OF THE INVENTION

In order to solve the above mentioned problems, the present invention provides an image resolution adjustment method comprising the steps of: (a) performing a predetermined selection rule in a scaling phase in which one of four scaling modes is selected to generate a scaling value set based on a source resolution $V_i$ and a display resolution $V_o$ for outputting a scaled image; and (b) determining whether or not the scaled image is smoothed based on the application requirement of display in a smoothing phase, wherein the predetermined selection rule comprises a first decision provided to determine whether or not a first scaling mode is selected; a second decision provided to determine whether or not a second scaling mode is selected; a third decision provided to determine whether or not a third scaling mode is selected; and a fourth decision provided to determine whether or not a fourth scaling mode is selected, wherein one of the scaling modes is selected to calculate the corresponding scaling value set so as to generate replicated pixels or lines for each pixel or line of the source image during a horizontal or vertical scaling period.

Therefore, it is a principal object of the present invention to provide an image resolution adjustment method in medical or other related applications to acquire higher resolution without content loss of a source image during the image scaling process.

It is another principal object of the present invention to provide an image resolution adjustment method to properly select one of the scaling modes in scaling phase and smoothing phases for converting a source image into a scaled image to meet the display resolution so as to ensure the scaled image having replicated pixels and replicated lines arranged in positional symmetry along horizontal and vertical directions in relation to the source image.

It is yet another principal object of the present invention to provide an image resolution adjustment method to properly smooth a scaled image in a smoothing phase based on a variety of application requirements of display.

It is yet another principal object of the present invention to provide an image resolution adjustment method to properly select one of the scaling modes for converting a source image into a scaled image based on the scaling factors of the value sets for pixel and line replications such that the scaling factors of the source image are arranged in a gradually decreased proportion from its central region to peripheral regions.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein:

FIG. 7A is diagrammatic sketch showing a first scaling mode operation from a source image with resolution 640×400 converted to a scaled image with display resolution 2048×1536 in the embodiment;

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims. Moreover, the diagrams included in the following are not completely drawn according to the real size and are only used to demonstrate features related to the present invention.

Figure 1:
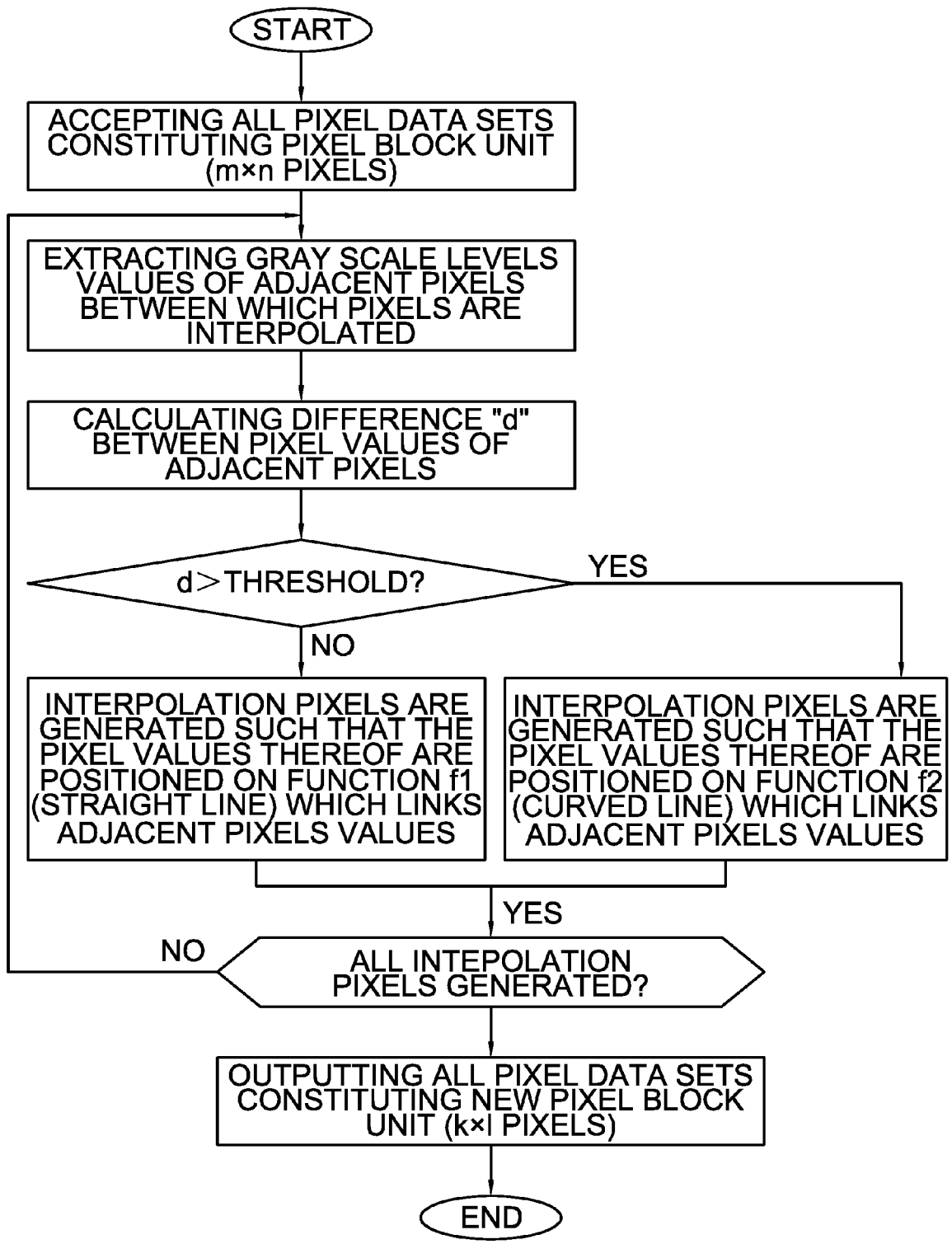
FIG. 1 is a flowchart showing an image scaling processing.
Figure 2:
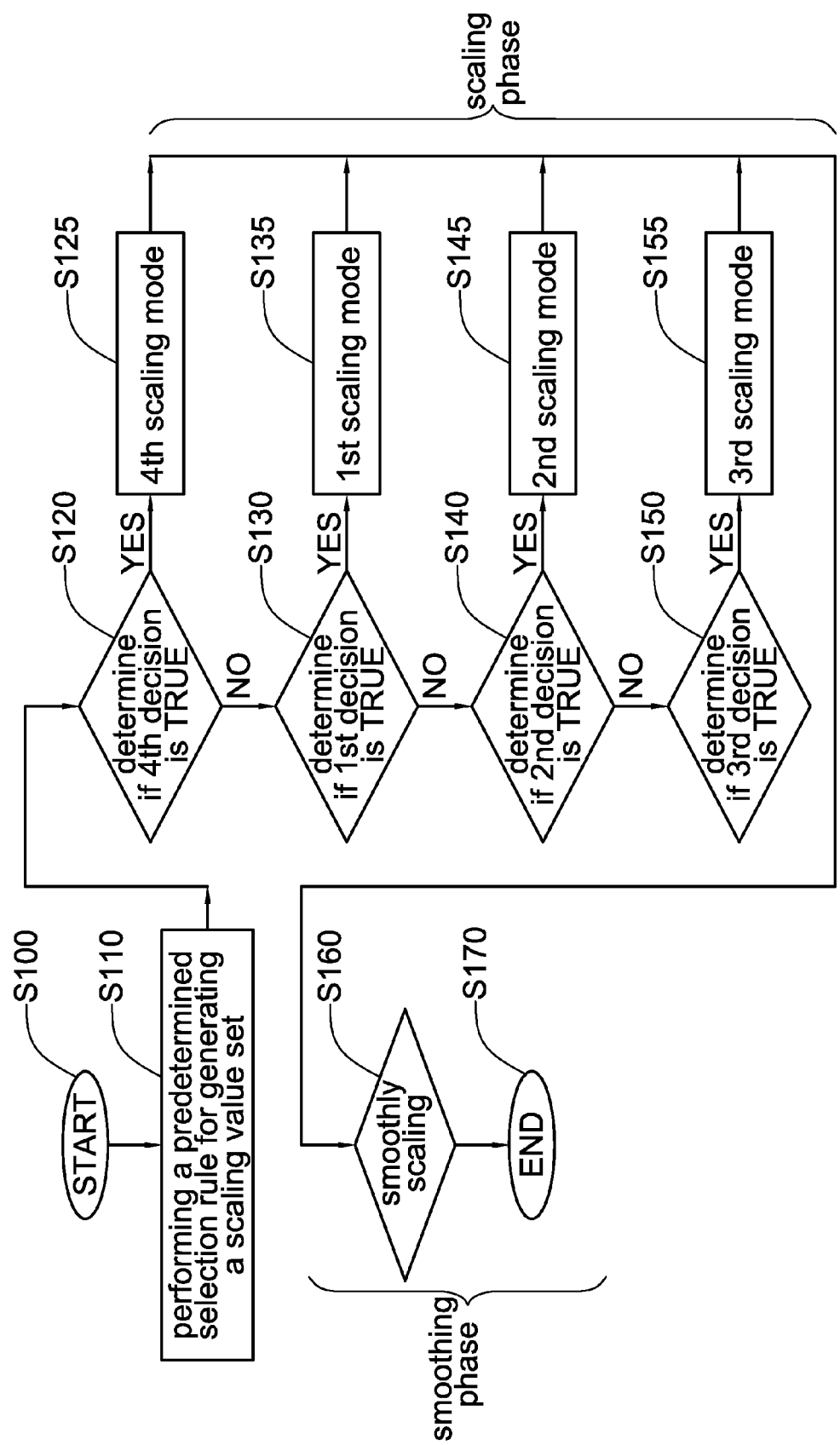
FIG. 2 is a flowchart showing an image scaling processing according to a first preferred embodiment of the invention.

Referred to FIG. 2, a first preferred embodiment of the invention is provided to disclose an image resolution adjustment method steps S100 including the steps S110, S120, S125, S130, S135, S140, S145, S150, S155, S160 and S170. In a scaling phase, the step S110 serves to perform a predetermined selection rule so as to generate a scaling value set based on a source resolution Vi of a source image and a display resolution Vo for subsequently outputting a scaled image for display, wherein the predetermined selection rule further comprises a first decision, a second decision, a third decision and a fourth decision. Next, the step S120 serves to perform a condition below so as to determine whether a fourth decision is set as TRUE or not:

$(Vo/Vi)=n$, where $n$ l is an integer.

If the condition is satisfied, then the fourth decision is set as TRUE (i.e. "yes") and the step S125 serves to perform a fourth scaling mode for generating a scaling value set indicating a scaling factor equal to n. Therefore, the source image is converted to the scaled image enlarged by n times in horizontal or vertical directions, respectively. In the smoothing phase, the step S160 serves to determine whether or not the scaled image is smoothed based on a variety of application requirements of display in a smoothing phase. Eventually, the step S170 serves to output the scaled image with or without the smoothing process for display.

Referred back to FIG. 2, when the fourth decision is set as NOT TRUE (i.e. "no"), then the step S130 serves to perform two conditions below to determine whether a first decision is set as TRUE or not:

$(Vo-Vi)<=(2*Vi)$, and $(Vo/Vi)=n$, where $n$ is not an integer.

If both the condition are satisfied, then the first decision is set as TRUE (i.e. "yes"), and the step S135 serves to perform a first scaling mode for generating a scaling value set including a center resolution Vc, a sided resolution Vs, and scaling factors corresponding to the center resolution Vc and the sided resolution Vs determined by the equations below:

$$Vc=(Vo-Vi)/2, \quad (1);$$

and $$Vs=(3*Vi-Vo)/4, \quad (2)$$

where Vc and Vs are integers, respectively, and the scaling factors corresponding to Vc and Vs are equal to 1 and 3, respectively. Hence, the source image is upscaled to a scaled image determined by the equations (1), (2) and corresponding scaling factors. In the smoothing phase, the step S160 serves to determine whether or not the scaled image is smoothed based on a variety of application requirements of display in a smoothing phase. Eventually, the step S170 serves to output the scaled image with or without the smoothing process for display. However, it is noted that when Vs is not an integer multiple, the step S160 determines to start the smoothing process in which Vs is divided into an upper sided resolution value Vs-up and a lower sided resolution value Vs-dn determined by the equations below:

$$Vs\text{-up}=(3*Vi-Vo)/4-0.5, \quad (3)$$

and $$Vs\text{-}dn=(3*Vi-Vo)/4+0.5. \quad (4)$$

Therefore, the source image is converted to a scaled image based on the scaling value set determined by the equations (1), (3) and (4), and eventually the step S170 serves to output the scaled image with the smoothing process for display. It is noted that both Vs-up and Vs-dn can be determined in the smoothing phase by the above mentioned equations (3) and (4), or equations (4) and (3), and the value of 0.5 in this embodiment provided in the equations (3) and (4) can be replaced with a different one to modify Vs-up and Vs-dn so as to improve image smoothness of the scaled image according to the display application. Besides, the equations (3) and (4) can be one of the smoothing methods and the present invention should not be limited to the particular method.

Referred back to FIG. 2, when the first decision is set as NOT TRUE (i.e. "no"), then the step S140 serves to perform three conditions below to determine whether a second decision is set to TRUE or not:

$(Vo-Vi)>(2*Vi)$, $(Vo/Vi)=n$, where $n$ is not an integer, and $(7*Vi)>2*Vo$.

If the three conditions are satisfied, then the second decision is set as TRUE (i.e. "yes"), then the step S145 serves to perform a second scaling mode for generating a scaling value set including a center resolution Vc, a sided resolution Vs and scaling factors corresponding to Vc and Vs determined by the equations below:

$$Vs=(Vo-3*Vi)/2, \quad (5)$$

$$Vc=Vi-2*Vs=x+y, \quad (6),$$

and $$2*x+z*y=Vo-2*Vs, \quad (7)$$

where x, y>0 and z=3, 4, 5, . . . , respectively, and the scaling factors are equal to 1, 2, 3 or an integer greater than 3. Therefore, the source image is converted to the scaled image based on the scaling value set determined by the equations (5)~(7). Referred back to FIG. 2, when the second decision is set as NOT TRUE (i.e. "no"), then the step S150 serves to perform three conditions below to determine whether a third decision is set as TRUE or not:

$$(Vo-Vi)>(2*Vi),$$

$(Vo/Vi)=n$, where $n$ is not an integer, and $$(7*Vi)<=2*Vo.$$

If the three conditions are satisfied, then the third decision is set as TRUE (i.e. "yes"), and the step S155 serves to perform a third scaling mode for generating a scaling value set including a center resolution Vc, a sided resolution Vs and scaling factors corresponding to Vc and Vs determined by the equations below:

$$Vs=Vi/4, \quad (8)$$

when Vs is an integer multiple.

Otherwise the step S160 determines to start the smoothing process in which Vs is divided into an upper sided resolution value Vs-up and a lower sided resolution value Vs-dn determined by the equations below:

$$Vs\text{-}up = Vi/4-0.5 \quad (9)$$

and $$Vs\text{-}dn = Vi/4+0.5. \quad (10)$$

Vc is determined by the two equations:

$$Vc=Vi-2*Vs=x+y, \quad (11)$$

and, $$2*x+z*y=Vo-Vi \quad (12)$$

where x, y>0 and z=3, 4, 5, . . . , respectively, and the scaling factors are equal to 2, 3 or an integer greater than 3. Therefore, the source image is converted to a scaled image based on the scaling value set determined by the equations (8)~(12). After the scaling phase is proceeded, the step S160 in the smoothing phase serves to determine whether or not the scaled image is smoothed dependent on a variety of application requirements of display. Eventually, the step S170 outputs the complete scaled image with/without the smoothing process to the display panel. It is noted that both Vs-up and Vs-dn can be determined in the smoothing phase by the above mentioned equations (9) and (10), or equations (10) and (9), and the value of 0.5 in this embodiment provided in the equations (9) and (10) can be replaced with a different one to modify Vs-up and Vs-dn so as to improve image smoothness of the scaled image according to the display application. Besides, the equations (9) and (10) can be one of the smoothing methods and the present invention should not be limited to the particular method.

Figure 3:
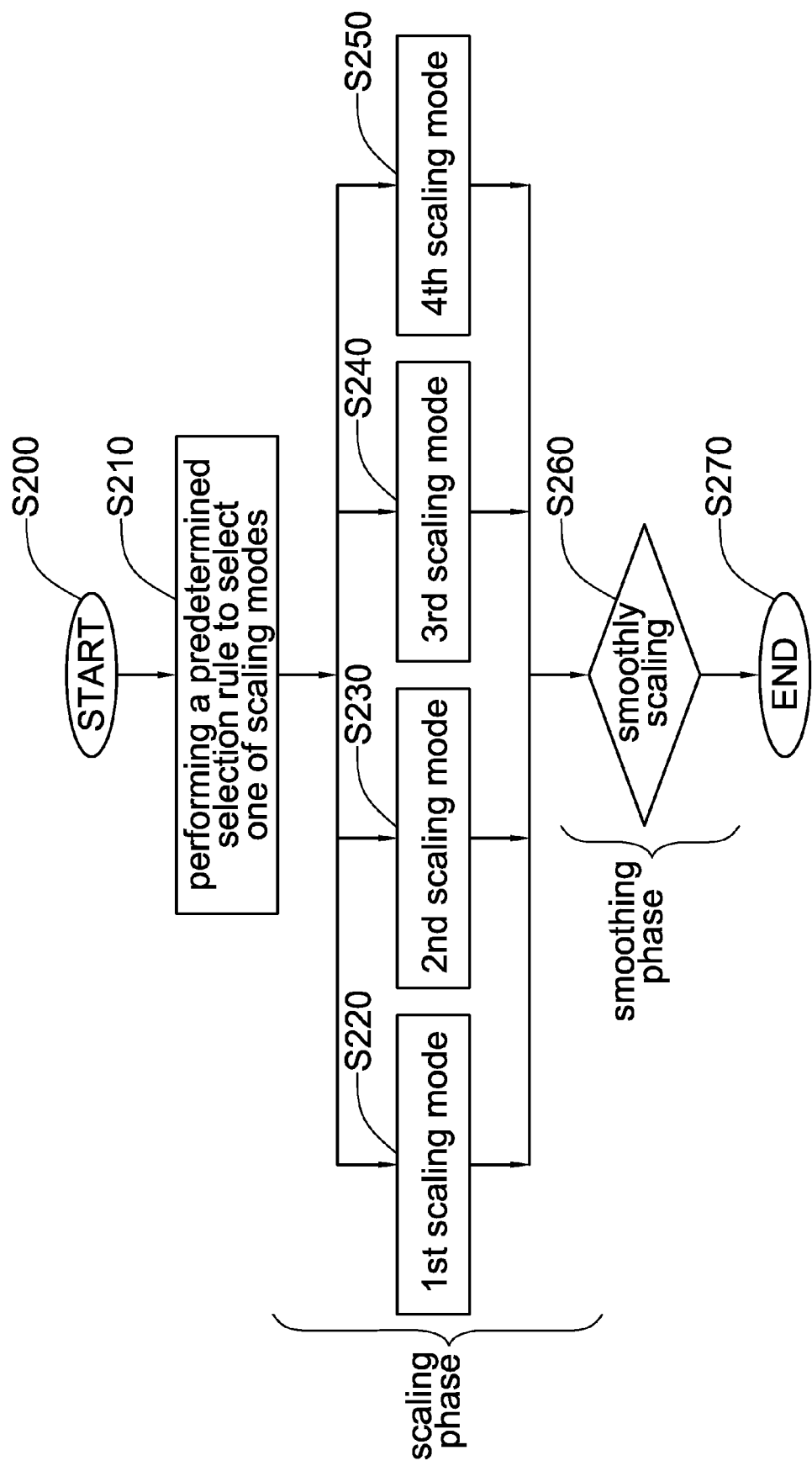
FIG. 3 is a flowchart showing an image scaling processing according to a second preferred embodiment of the invention.

Referred to FIG. 3, a second preferred embodiment of the invention is provided to disclose an image resolution adjustment method steps S200 including the steps S210, S220, S230, S240, S250, S260 and S270. In a scaling phase, the step S210 serves to perform a predetermined selection rule to select one of four scaling modes to generate a scaling value set based on a source resolution Vi of a source image and a display resolution Vo for subsequently outputting a scaled image for display, wherein the scaling modes are a first scaling mode executed by the S220, a second scaling mode executed by the S230, a third scaling mode executed by the S240, and a fourth scaling mode executed by the S250, respectively. When one of the scaling modes is selected, a corresponding scaling value set is determined by the above mentioned equations in the first preferred embodiment so as to generate a scaled image. The S260 serves to determine whether or not the scaled image is smoothed based on a variety of application requirements of display in the smoothing phase. For example, when Vs is not an integer multiple, the step S260 determines to start the smoothing process in which Vs is divided into an upper sided resolution value Vs-up and a lower sided resolution value Vs-dn. Eventually, the step S270 serves to output the scaled image with or without the smoothing process for display.

According to one of the above mentioned embodiments, the image resolutions and display resolutions including (1024×768) vs (2560×2048), (640×350) vs (1024×768), (640×350) vs (1600×1200), and (640×400) vs (2048×1536) are conformed to the VESA standard and are described as follows. According to the above mentioned horizontal and vertical scaling, any source image having lower resolution can be converted or upscaled to a display image having higher resolution conversion without content lost for the source image during the image scaling process.

Figure 4A:
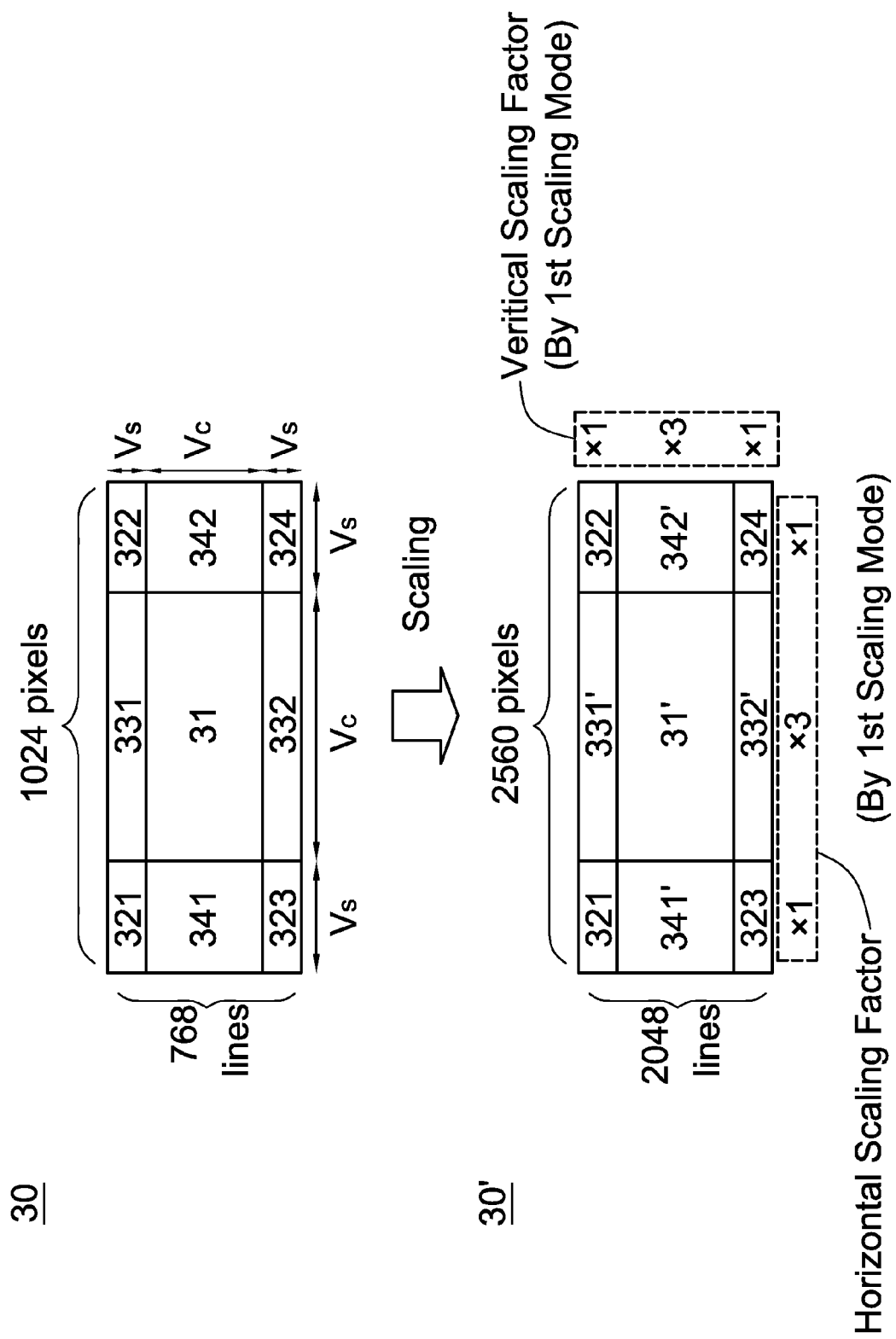
FIG. 4A is diagrammatic sketch showing a first scaling mode operation from a source image with resolution 1024×768 converted to a scaled image with display resolution 2560×2048 in the embodiment.
Figure 4B:
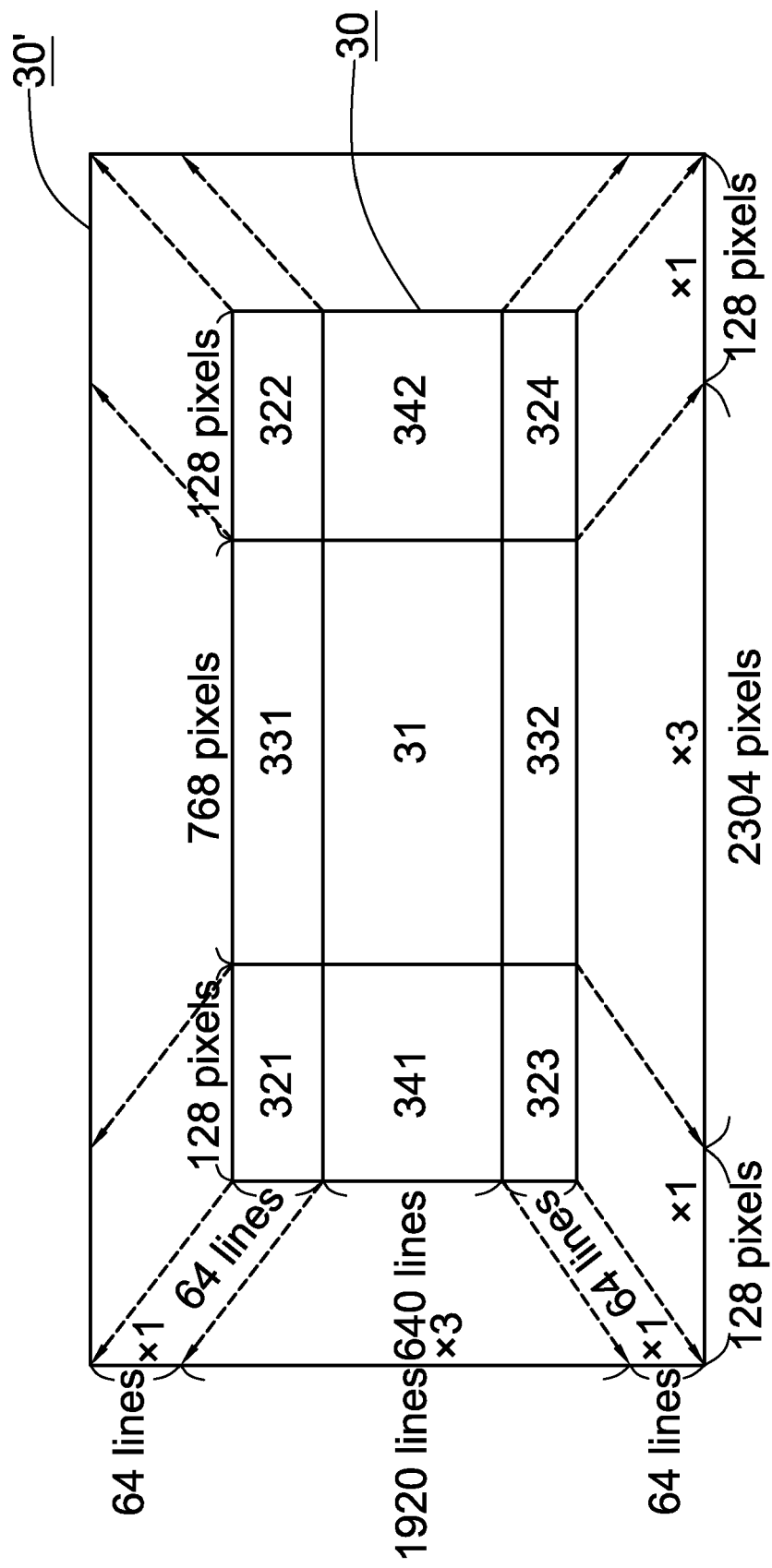
FIG. 4B is a diagrammatic sketch showing a mapping relation from source resolution 1024×768 onto display resolution 2560×2048 in the embodiment.

Referred to FIGS. 4A and 4B, the first scaling mode operation provided for a source image 30 of resolution Vi (1024×768) converted into a display image 30' of resolution Vo (2560×2048) and the mapping relation between source image 30 and display image 30' are described herein. In the scaling phase, the first scaling mode is triggered according to the predetermined selection rule so as to calculate a value set including a center resolution Vc and a sided resolution Vs during a horizontal and a vertical scaling periods, and Vc and Vs are determined by equations (1) and (2). Hence, in this case, the source image 30 is logically divided into a plurality of source blocks 31, 321, 322, 323, 324, 331, 332, 341 and 342. During the horizontal scaling period, each of the source blocks 31, 331 and 332 has a divided resolution value Vc=768 pixels determined by the equation (1), and each of the source blocks 321, 322, 323, 324, 341 and 342 has a divided resolution value Vs=128 pixels determined by the equation (2). During the vertical scaling period, each of the source blocks 31, 341 and 342 has a divided resolution value Vc=640 lines determined by the equation (1), and each of the source blocks 321, 322, 323, 324, 331 and 332 has a divided resolution value Vs=64 lines determined by the equation (2), Vc and Vs labeled in FIG. 4A and its corresponding values labeled in FIG. 4B. In this case, the smoothing phase is not executed due to its application requirement of display.

Referred back to FIGS. 4A and 4B, for example, the source center block 31 of a divided resolution (768 pixels×640 lines) has a pair of scaling factors: x3 and x3 in horizontal and vertical directions respectively so that the source center block 31 (768 pixels×640 lines) can be upscaled to the corresponding display center block 31' (2304 pixels×1920 lines) by a horizontal scaling factor x3 and a vertical scaling factor x3 where the display center block 31' is indicated as 31' (x3, x3). Similarly, the other source blocks 321, 322, 323, 324, 331, 332, 341 and 342 of the source image 30 are upscaled to the display blocks 321(x1, x1), 322 (x1, x1), 323(x1, x1), 324(x1, x1), 331' (x3, x1), 332' (x3, x1), 341' (x1, x3), and 342' (x1, x3) shown in FIG. 4A, wherein each of the display blocks 331', 332', 341' and 342' numbering ended with ' in the display image 30' means that there is at least a scaling factor greater than one in either horizontal or vertical scaling while each of the blocks 321, 322, 323 and 324 numbering ended without ' in the display image 30' is remained as its same original source image.

Besides, referred back to FIG. 4B, resolutions of the source blocks 321, 322, 323, 324, 331, 332, 341 and 342 are symmetrical in relation to the source center block 31 of the source image 30. From the perspective of resolution symmetry, there is a horizontal axis of symmetry for resolution equality between the source blocks 331 and 332 (equal to 768×64), between the source blocks 321 and 323 (equal to 128×64), and between the source blocks 322 and 324 (equal to 128×64). Moreover, there is also a vertical axis of symmetry for resolution equality between the source blocks 321 and 322 (equal to 128×64), between the source blocks 323 and 324 (equal to 128×64), and between the source blocks 341 and 342 (equal to 128×640). Similarly, the resolutions of the display blocks in the display image 30' have the same symmetrical relations as that of the source blocks as mentioned above. Referred back to FIG. 4B, the scaling factors corresponding to the source blocks 31, 321, 322, 323, 324, 331, 332, 341 and 342 can be identified and here indicated as 31(x3, x3), 321(x1, x1), 322 (x1, x1), 323(x1, x1), 324(x1, x1), 331(x3, x1), 332(x3, x1), 341(x1, x3) and 342(x1, x3). From the perspective of gradual proportion, the scaling factors corresponding to the source image 30 are arranged in a gradually decreased proportion from the central area of the source image 30 to a peripheral area of the source image 30. For example, the source center block 31 has a pair of scaling factors (x3, x3) in horizontal and vertical directions, and each of the peripheral source blocks 321, 322, 323, 324, 331, 332, 341 and 342 surrounding the source center block 31 has its own pair of scaling factors in (x1, x1), (x3, x1) or (x1, x3) such that the scaling factors of the peripheral source blocks are arranged in a gradually decreased order in relation to that of the source center block 31. Referred to FIGS. 5A and 5B, the first scaling mode operation also provided for a source image 40 of resolution Vi (640×350) converted into a display image 40' of resolution Vo (1024×768) and the mapping relation between source image 40 and display image 40' are described herein. In the scaling phase, the first scaling mode is again triggered according to the predetermined selection rule so as to calculate a value set including a center resolution Vc and a sided resolution Vs during a horizontal and a vertical scaling periods, and the sided resolution Vs, in the case that Vs is not an integer calculated by the equation (2), is determined in the smoothing phase by an up-sided resolution Vs-up and a down-sided resolution Vs–dn determined by equations (3) and (4). Hence, the source image 40 is logically divided into a plurality of source blocks 41, 421, 422, 423, 424, 431, 432, 441 and 442 wherein the source center block 41 has a divided resolution value Vc=192 pixels determined by the equation (1) during the horizontal scaling period and Vc=209 lines determined by the equation (1) during the vertical scaling period, Vc labeled in FIG. 5A and its corresponding values labeled in FIG. 5B. Besides, each of the peripheral source blocks 421, 422, 423, 424, 431, 432, 441 and 442 surrounding the source center block 41 has its respective divided resolution value Vs in pixels determined by the equation (2) during its horizontal scaling period, and Vs in lines has Vs-up and Vs-dn determined by the equations (3) and (4) during its vertical scaling period, Vs-up or Vs-dn labeled in FIG. 5A and its corresponding values labeled in FIG. 5B. For example, both the source blocks 421 and 423 surrounding the source center block 41 have the same resolution values Vs during its horizontal scaling period but both have slightly different resolution values Vs corresponding to Vs-up and Vs-dn during its vertical scaling period, that is, the source blocks 421 has a resolution value Vs=227 pixels during its horizontal scaling period and Vs-up=70 lines as Vs during its vertical scaling period while the source blocks 423 has the same resolution value Vs=227 pixels during its horizontal scaling period and Vs–dn=71 lines as Vs during its vertical scaling period. Therefore, each of the other source blocks 422, 424, 431, 432, 441 and 442 surrounding the source center block 41 has its respective resolution values Vs and (that is Vs-up or Vs-dn) in pixels and lines labeled in FIG. 5B during its horizontal and vertical scaling period. It is noted that both Vs-up and Vs-dn can be determined in the smoothing phase by the above mentioned equations (3) and (4), or equations (4) and (3), and the value of 0.5 in this embodiment provided in the equations (3) and (4) can be replaced with a different one to modify Vs-up and Vs-dn so as to improve image smoothness of the scaled image according to the display application. Besides, the equations (3) and (4) can be one of the smoothing methods and the present invention should not be limited to the particular method.

Figure 5A:
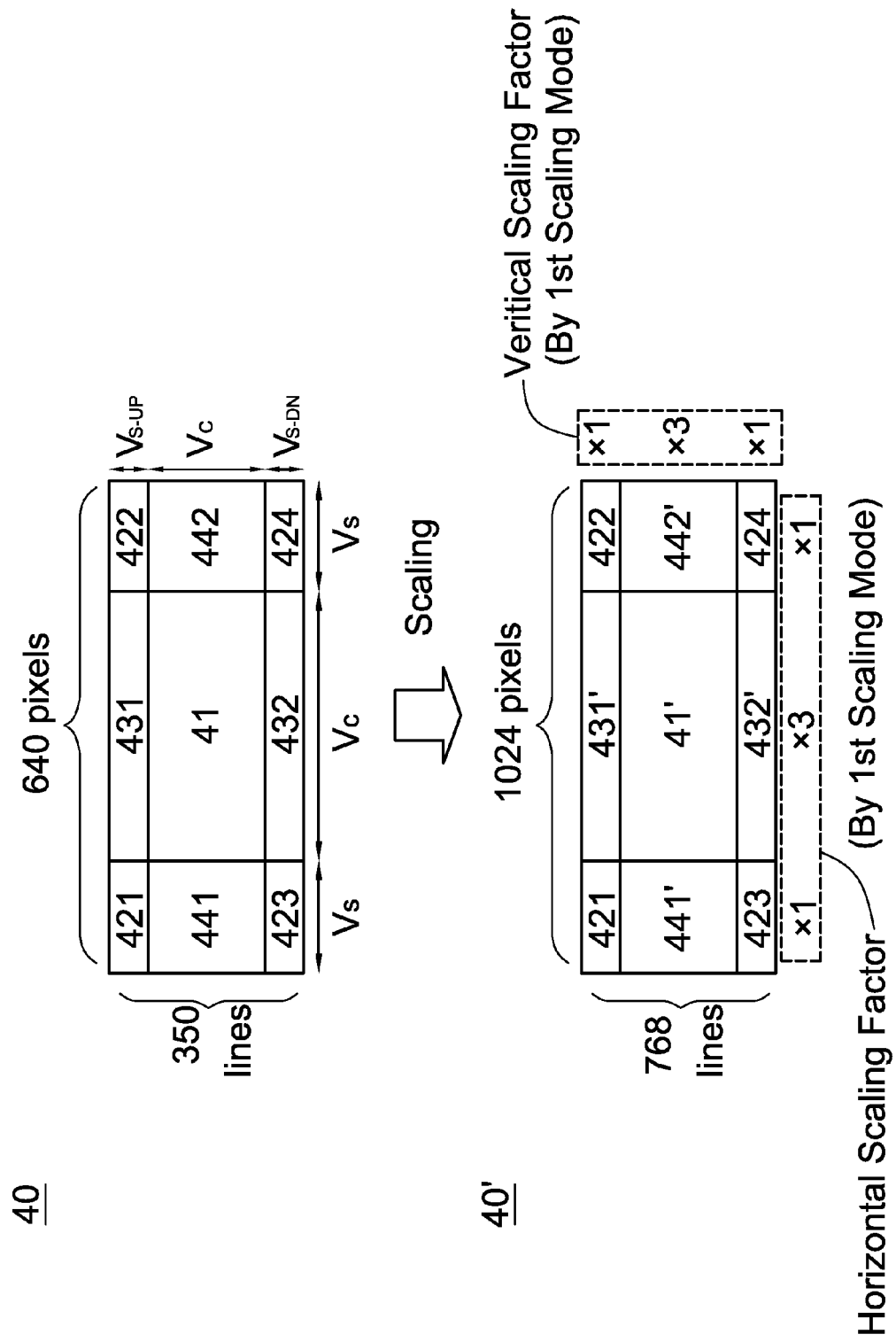
FIG. 5A is diagrammatic sketch showing a first scaling mode operation from a source image with resolution 640×350 converted to a scaled image with display resolution 10240×768 in the embodiment.
Figure 5B:
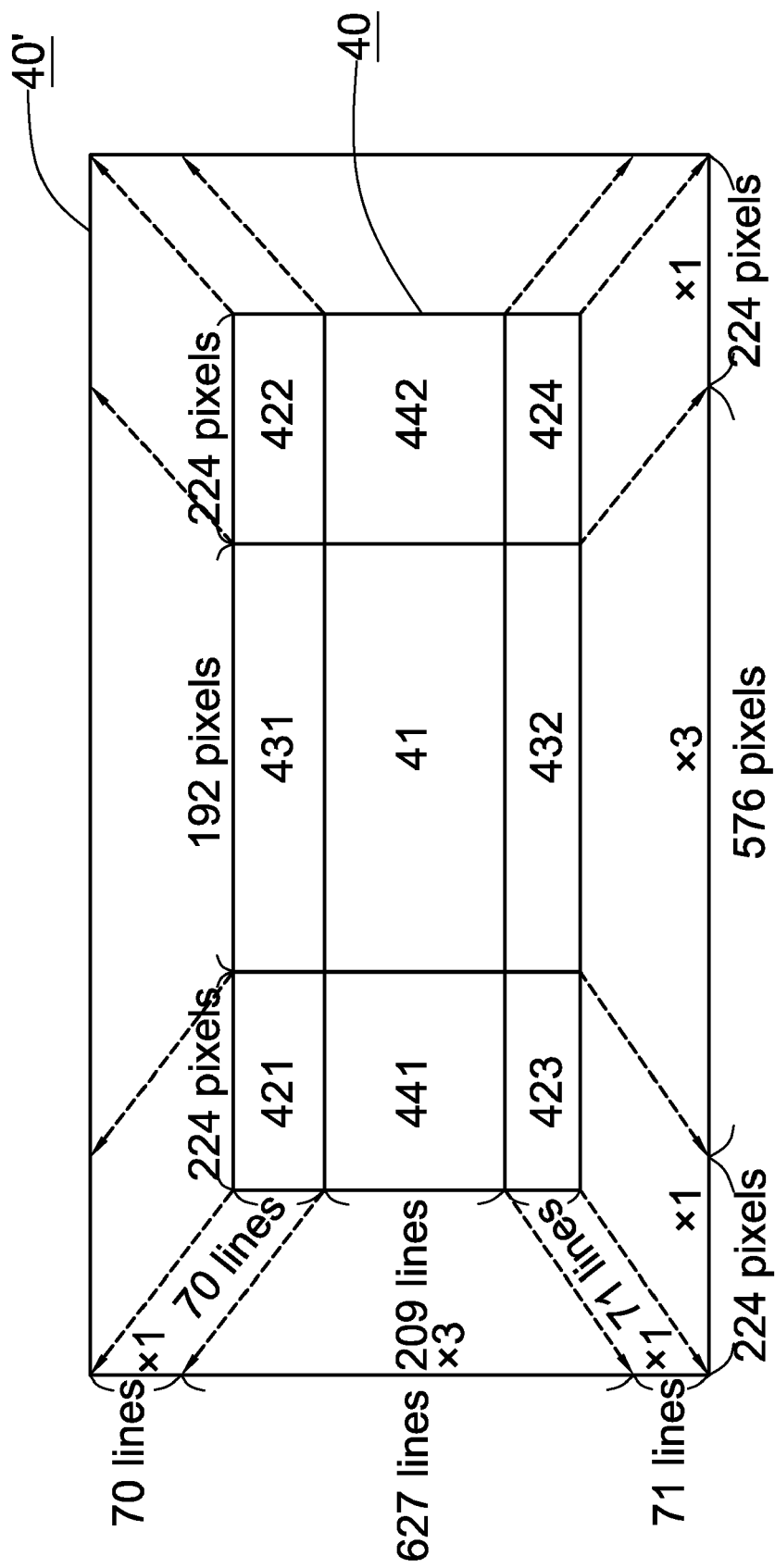
FIG. 5B is a diagrammatic sketch showing a mapping relation from the source resolution 640×350 onto the display resolution 1024×768 in the embodiment.

Referred back to FIGS. 5A and 5B, for example, the source center block 41 of a divided resolution (192 pixels×209 lines) has a pair of scaling factors: x3 and x3 in horizontal and vertical directions respectively so that the source center block 41 (192 pixels×209 lines) can be upscaled to the corresponding display center block 41' (576 pixels×627 lines) by a horizontal scaling factor x3 and a vertical scaling factor x3 where the display center block 41' is indicated as 41' (x3, x3). Similarly, the other source blocks 421, 422, 423, 424, 431, 432, 441 and 442 of the source image 40 are upscaled to the display blocks 421(x1, x1), 422 (x1, x1), 423(x1, x1), 424(x1, x1), 431'(x3, x1), 432'(x3, x1), 441'(x1, x3), and 442' (x1, x3) shown in FIG. 5A, wherein each of the display blocks 431', 432', 441' and 442' numbering ended with ' in the display image 40' means that there is at least a scaling factor greater than one in either horizontal or vertical scaling while each of the blocks 421, 422, 423 and 424 numbering ended without ' in the display image 40' is remained as its same original source image.

Besides, referred back to FIG. 5B, resolutions of the source blocks 421, 422, 423, 424, 431, 432, 441 and 442 are symmetrical in relation to the source center block 41 of the source image 40. From the perspective of resolution symmetry, there is a horizontal axis of symmetry for resolution quasi-equality between the source blocks 431 and 432 (192×70 quasi-equal to 192×71), between the source blocks 421 and 423 (224×70 quasi-equal to 224×71), and between the source blocks 422 and 424 (224×70 quasi-equal to 224×71). Moreover, there is also a vertical axis of symmetry for resolution equality between the source blocks 421 and 422 (equal to 224×70), between the source blocks 423 and 424 (equal to 224×71), and between the source blocks 441 and 442 (equal to 224×209). Similarly, the resolutions of the display blocks in the display image 40' have the same symmetrical relations as that of the source blocks as mentioned above.

Referred back to FIG. 5B, the scaling factors corresponding to the source blocks 421, 422, 423, 424, 431, 432, 441 and 442 are generated in gradual proportion in relation to the source center block 41 of the source image 40. From the perspective of gradual proportion, scaling factors are arranged in a gradually decreased proportion from the central area of the source image 40 to a peripheral area of the source image 40. For example, the source center block 41 has a pair of scaling factors (x3, x3) in horizontal and vertical directions, and each of the peripheral source blocks 421, 422, 423, 424, 431, 432, 441 and 442 surrounding the source center block 41 has its own pair of scaling factors in (x1, x1) or (x3, x1) or (x1, x3) arranged in a gradually decreased order from the pair of scaling factors (x3, x3) of the source center block 41.

Figure 6A:
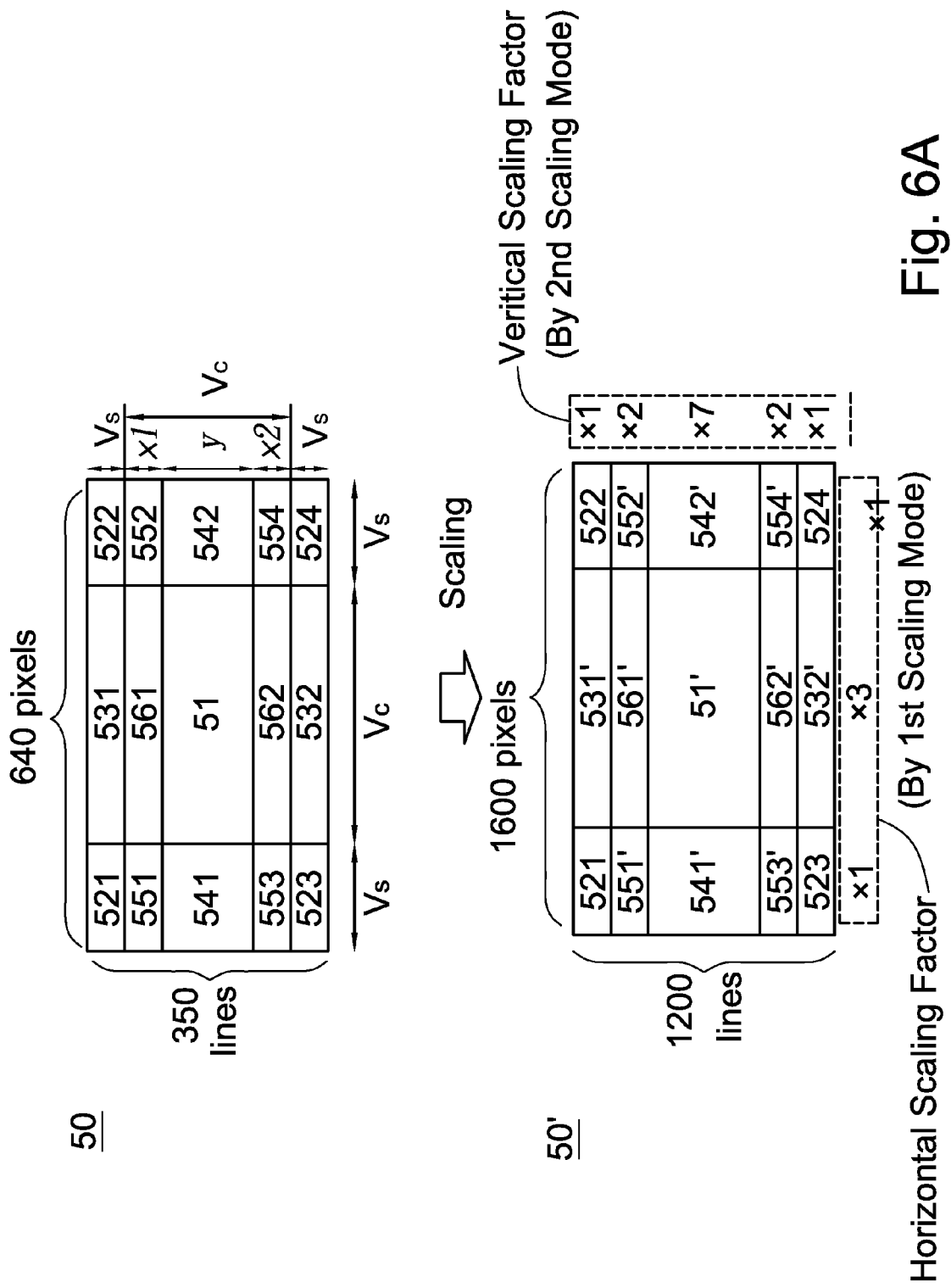
FIG. 6A is diagrammatic sketch showing a first scaling mode operation from a source image with resolution 640×350 converted to a scaled image with display resolution 1600×1200 in the embodiment.
Figure 6B:
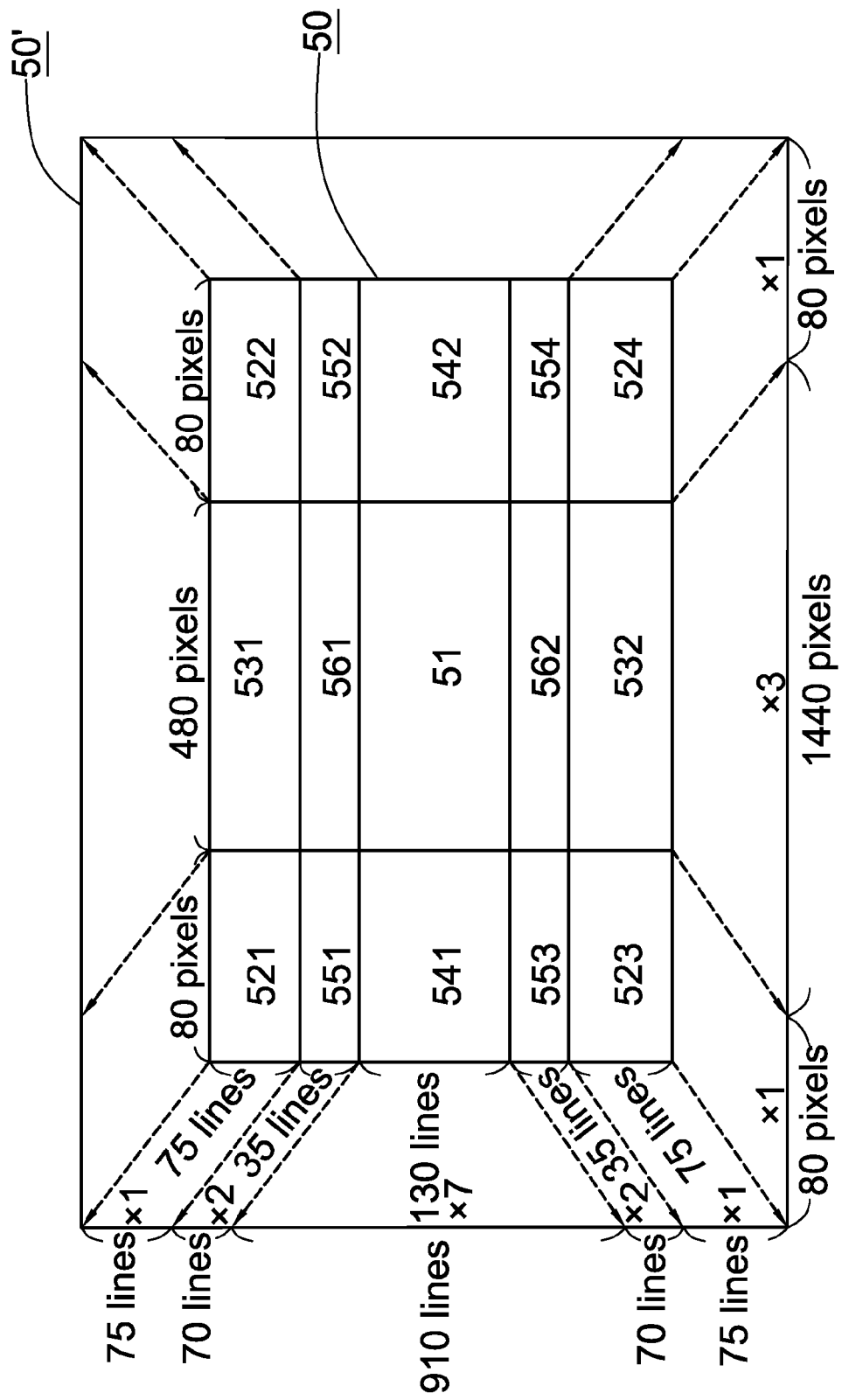
FIG. 6B is a diagrammatic sketch showing a mapping relation from the source resolution 640×350 onto the display resolution 1600×1200 in the embodiment.

Referred to FIGS. 6A and 6B, operations of the first and second scaling modes are provided for a source image 50 of resolution Vi (640×350) converted into a display image 50' of resolution Vo (1600×1200) and the mapping relation between source image 50 and display image 50' are described herein. In the scaling phase, the first scaling mode and the second scaling mode are triggered in the horizontal and vertical scaling periods, respectively, according to the predetermined selection rule so as to calculate one value set including a sided resolution Vs and a center resolution Vc determined by equations (1) and (2) during the horizontal scaling period, and another value set including a sided resolution Vs and a center resolution Vc determined by equations (5), (6) and (7) during the vertical scaling period, and x1, x2, y, Vs and Vc (combined by x1, y and x2) are labeled in FIG. 6A. In this case, the smoothing phase is not executed due to its application requirement of display.

The source image 50 is logically divided into five sections of source blocks for each of sections including three source column blocks. All the source blocks are indicated by 521, 531 and 522 for the 1$^{st}$ section, 551, 561 and 552 for the 2$^{nd}$ section, 541, 51 and 542 for the 3$^{rd}$ section, 553, 562 and 554 for the 4$^{th}$ section, and 523, 532 and 524 for the 5$^{th}$ section, accordingly. Each of source blocks has its resolution value in pixels determined from the equations (1) and (2) during the horizontal scaling period, and its resolution value in lines determined from the equations (5), (6) and (7) during the vertical scaling period. For example, during the horizontal scaling period, each of the source blocks 51, 531, 532, 561 and 562 has its corresponding resolution value Vc=480 pixels, Vc labeled in FIG. 6A and its corresponding values labeled in FIG. 6B, determined by the equation (1); each of the source blocks 521, 522, 523, 524, 541, 542, 551, 552, 553 and 554 has its corresponding resolution value Vs=80 pixels, Vs labeled in FIG. 6A and its corresponding values labeled in FIG. 6B, determined by the equation (2). During the vertical scaling period, each of the source blocks 521, 522, 523, 524, 531 and 532 has its corresponding resolution value Vs=75 lines, Vs labeled in FIG. 6A and its corresponding values labeled in FIG. 6B, determined by the equation (5); each of the source blocks 551, 552 and 561 has its corresponding resolution value x1=35 lines, x1 labeled in FIG. 6A and its corresponding values labeled in FIG. 6B, determined by the equations (6) and (7); each of the source blocks 553, 554 and 562 has its corresponding resolution value x2=35 lines, x2 labeled in FIG. 6A and its corresponding values labeled in FIG. 6B, determined by the equations (6) and (7); each of the source blocks 51, 541 and 542 has its corresponding resolution value y=130 lines, y labeled in FIG. 6A and its corresponding values labeled in FIG. 6B, determined by the equations (6) and (7). Usually, both x1 and x2 in lines can be set to equal between the source blocks 551 and 553, between 552 and 554, between 561 and 562 in relation to the source center block 51 so as to further maintain better visional effect of display.

Besides, referred back to FIG. 6A, each of the source blocks has its pair of corresponding scaling factors in horizontal and vertical directions respectively so that all the source blocks can be upscaled to the corresponding display blocks by multiplying the resolution value of each source block by the scaling factor thereof. Therefore, each display block having its pair of corresponding scaling factors (horizontal, vertical) is indicated as 51' (x3, x7), 521(x1, x1), 522(x1, x1), 523(x1, x1), 524(x1, x1), 531' (x3, x1), 532' (x3, x1), 541' (x1, x7), 542' (x1, x7), 551' (x1, x2), 552' (x1, x2), 553' (x1, x2), 554' (x1, x2), 561' (x3, x2) and 562' (x3, x2), wherein each of the display blocks 51', 531', 532', 541', 542', 551', 552', 553', 554', 561' and 562' numbering ended with ' in the display image 50' means that there is at least a scaling factor greater than one in either horizontal or vertical scaling while each of the display blocks 521, 522, 523 and 524 numbering ended without ' in the display image 50' is remained as its same original source image.

Referred back to FIG. 6B, from the perspective of the resolution symmetry in relation to the source center block 51, there is a horizontal axis of symmetry for resolution equality between the source blocks 531 and 532 (equal to 480×75), between the source blocks 521 and 523 (equal to 80×75), between the source blocks 522 and 524 (equal to 80×75), between the source blocks 551 and 553 (equal to 80×35), between the source blocks 552 and 554 (equal to 80×35), and between the source blocks 561 and 562 (equal to 480×35) in relation to the source center block 51 along a horizontal direction. Moreover, there is also a vertical axis of symmetry for resolution equality between the source blocks 521 and 522 (equal to 80×75), between the source blocks 523 and 524 (equal to 80×75), between the source blocks 541 and 542 (equal to 80×130), between the source blocks 551 and 552 (equal to 80×35), and between the source blocks 553 and 554 (equal to 80×35) in relation to the source center block 51 along a vertical direction. Similarly, the resolutions of the display blocks in the display image 50' have the same symmetrical relations as that of the source blocks as mentioned above.

Referred back to FIG. 6B, the scaling factors corresponding to the source blocks except the source center block 51 are generated in gradual proportion in relation to the source center block 51 of the source image 50. From the perspective of gradual proportion, the scaling factors are arranged in a gradually decreased proportion from the central area of the source image 50 to a peripheral area of the source image 50. For example, the source center block 51 has a pair of scaling factors indicated as 51(x3, x7), and the first peripheral source blocks 541, 542, 561 and 562 surrounding the source center block 51 have pairs of scaling factors as 541(x1, x7), 542(x1, x7), 561(x3, x2), and 562(x3, x2) circumferentially arranged in a gradually decreased order from the pair of scaling factors (x3, x7) of the source center block 51. The second peripheral source blocks 531, 532, 551, 552, 553 and 554 surrounding the first peripheral source blocks have pairs of scaling factors as 531(x3, x1), 532(x3, x1), 551(x1, x2), 552(x1, x2), 553(x1, x2) and 554(x1, x2) circumferentially arranged in a gradually decreased order from the pairs of scaling factors of first peripheral source blocks. The third peripheral source blocks 521, 522, 523 and 524 surrounding the second peripheral source blocks have pairs of scaling factors as 521(x1, x1), 522(x1, x1), 523(x1, x1) and 524(x1, x1) circumferentially arranged in a gradually decreased order from the pairs of scaling factors of second peripheral source blocks.

Figure 7B:
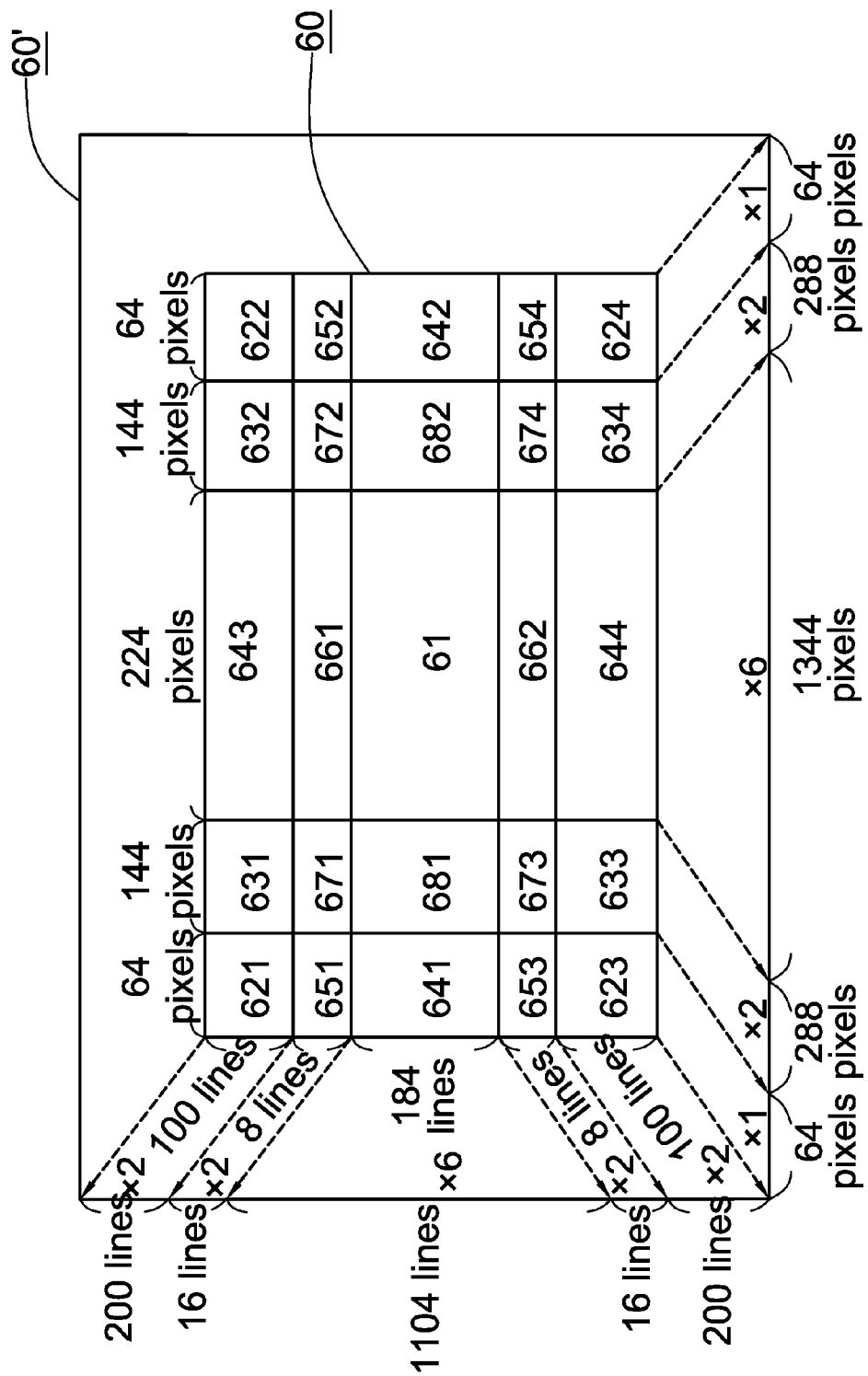
FIG. 7B is a diagrammatic sketch showing a mapping relation from source resolution 640×400 onto display resolution 2048×1536 in the embodiment.

Referred to FIGS. 7A and 7B, operations of the second and third scaling modes are provided for a source image 60 of resolution Vi (640×400) converted into a display image 60' of resolution Vo (2048×1536) and the mapping relation between source image 60 and display image 60' are described herein. In the scaling phase, the second scaling mode and the third scaling mode are triggered in the horizontal and vertical scaling periods, respectively, according to the predetermined selection rule, so as to calculate one value set including a sided resolution Vs and a center resolution Vc determined by equations (5)~(7) during the horizontal scaling period, and another value set including a sided resolution Vs and a center resolution Vc during the vertical scaling period wherein Vs is determined by equation (8) if Vi is an integer multiple of four, otherwise Vs is selected from Vs-up and Vs-dn determined by equation (9) or (10) in the smoothing phase, and wherein Vc is divided into x and y determined by equations (11) and (12), and x1, x2, y, Vs and Vc (divided into x1, y and x2) are labeled in FIG. 7A. It is noted that both Vs-up and Vs-dn can be determined in the smoothing phase by the above mentioned equations (9) and (10), or equations (10) and (9), and the value of 0.5 in this case provided in the equations (9) and (10) can be replaced with a different value to modify Vs-up and Vs-dn so as to improve image smoothness of the scaled image according to the display application. Besides, the equations (9) and (10) can be one of the smoothing methods and the present invention should not be limited to the particular method.

In this case, the source image 60 is logically divided into five sections of source blocks for each of sections including five source column blocks. All the source blocks are indicated by 621, 631, 643, 632 and 622 for the $1^{st}$ section, 651, 671, 661, 672 and 652 for the $2^{nd}$ section, 641, 681, 61, 682 and 642 for the $3^{rd}$ section, 653, 673, 662, 674 and 654 for the $4^{th}$ section, and 623, 633, 644, 634 and 624 for the $5^{th}$ section, accordingly. Each of the source blocks has its resolution value in pixels determined from the equations (5), (6) and (7) during the horizontal scaling period, and its resolution value in lines determined from the equations (8), (9), (10), (11) and (12) during the vertical scaling period. For example, during the horizontal scaling period, each of the source blocks 621, 622, 623, 624, 641, 642 651, 652, 653 and 654 has its corresponding resolution value Vs=64 pixels determined by the equation (5), Vs labeled in FIG. 7A and its corresponding values labeled in FIG. 7B; each of the source blocks 631, 671, 681, 673 and 633 has its corresponding resolution value x1=144 pixels determined by the equations (6) and (7), labeled in FIG. 7A and its corresponding values labeled in FIG. 7B; each of the source blocks 632, 672, 682, 674 and 634 has its corresponding resolution value x2=144 pixels determined by the equations (6) and (7), labeled in FIG. 7A and its corresponding values labeled in FIG. 7B; each of the source blocks 643, 661, 61, 662 and 644 has its corresponding resolution value y=224 pixels determined by the equations (6) and (7), labeled in FIG. 7A and its corresponding values labeled in FIG. 7B. Usually, both x1 and x2 in pixels are set to be equal between the source blocks 631 and 632, between 633 and 634, between 671 and 672, between 673 and 674, and between 681 and 682 in relation to the source center block 61, so as to further maintain better visional effect of display. During the vertical scaling period, each of the source blocks 621, 622, 623, 624, 631, 632 633, 634, 643 and 644 has its corresponding resolution value Vs=100 lines determined by the equation (8), Vs labeled in FIG. 7A and its corresponding values labeled in FIG. 7B; each of the source blocks 651, 671, 661, 672 and 652 has its corresponding resolution value x1==8 lines determined by the equations (11) and (12), labeled in FIG. 7A and its corresponding values labeled in FIG. 7B; each of the source blocks 653, 673, 662, 674 and 654 has its corresponding resolution value x2=8 lines determined by the equations (11) and (12) labeled in FIG. 7A and its corresponding values labeled in FIG. 7B; each of the source blocks 641, 681, 61, 682 and 642 has its corresponding resolution value y=184 lines determined by the equations (11) and (12), labeled in FIG. 7A and its corresponding values labeled in FIG. 7B. Usually, both x1 and x2 in lines are set to be equal between the source blocks 651 and 653, between 652 and 654, between 661 and 662, between 671 and 673, between 672 and 674 in relation to the source center block 61, so as to further maintain better visional effect of display. Besides, referred back to FIG. 7A, each of the source blocks has its pair of corresponding scaling factors in horizontal and vertical directions respectively so that all the source blocks can be upscaled to the corresponding display blocks by multiplying the resolution value of each source block by the scaling factor thereof. Therefore, each display block having its pair of corresponding scaling factors (horizontal, vertical) is indicated as 61' (x6, x6), 621' (x1, x2), 622' (x1, x2), 623' (x1, x2), 624' (x1, x2), 631' (x2, x2), 632' (x2, x2), 633' (x2, x2), 634' (x2, x2), 641' (x1, x6), 642' (x1, x6), 651' (x1, x2), 652' (x1, x2), 653' (x1, x2), 654' (x1, x2), 661' (x6, x2), 662' (x6, x2), 671' (x2, x2), 672' (x2, x2), 673' (x2, x2), 674' (x2, x2), 681' (x2, x6) and 682' (x2, x6), wherein all of the display blocks numbering ended with ' in the display image 60' means that there is at least a scaling factor greater than one in either horizontal or vertical scaling.

Referred back to FIG. 7B, from the perspective of the resolution symmetry in relation to the source center block 61, there is a horizontal axis of symmetry for resolution equality in relation to the source center block 61 along a horizontal direction between the source blocks 631 and 633 (equal to 144×100), between the source blocks 632 and 634 (equal to 144×100); between the source blocks 621 and 623 (equal to 64×100), between the source blocks 622 and 624 (equal to 64×100); between the source blocks 651 and 653 (equal to 64×8), between the source blocks 652 and 654 (equal to 64×8); between the source blocks 661 and 662 (equal to 224×8); between the source blocks 671 and 673 (equal to 144×8), between the source blocks 672 and 674 (equal to 144×8). Moreover, there is also a vertical axis of symmetry for resolution equality in relation to the source center block 61 along a vertical direction between the source blocks 621 and 622 (equal to 64×100), between the source blocks 623 and 624 (equal to 64×100); between the source blocks 631 and 632 (equal to 144×100), between the source blocks 633 and 634 (equal to 144×100); between the source blocks 651 and 652 (equal to 64×8), and between the source blocks 653 and 654 (equal to 64×8); between the source blocks 641 and 642 (equal to 64×184); between the source blocks 681 and 682 (equal to 144×184); between the source blocks 671 and 672 (equal to 144×8), and between the source blocks 673 and 674 (equal to 144×184). Similarly, the resolutions of the display blocks in the display image 60' have the same symmetrical relations as that of the source blocks as mentioned above.

Referred back to FIG. 7B, the scaling factors corresponding to the source blocks except the source center block 61 are generated in gradual proportion in relation to the source center block 61 of the source image 60. From the perspective of gradual proportion, the scaling factors corresponding to the source image 60 are arranged in a gradually decreased proportion from the central area of the source image 60 to a peripheral area of the source image 60. For example, the source center block 61 has a pair of scaling factors indicated as 61(x6, x6), and the first peripheral source blocks 671, 661, 672, 682, 674, 662, 673 and 681 surrounding the source center block 61 have pairs of scaling factors such as 671(x2, x2), 661(x6, x2), 672(x2, x2), 682(x2, x6), 674(x2, x2), 662 (x6, x2), 673(x2, x2) and 681(x2, x6) arranged in a gradually decreased order from the pair of scaling factors (x6, x6) of the source center block 61. The second peripheral source blocks 621, 631, 643, 632, 622, 652, 642, 654, 624, 634, 644, 633, 623, 653, 641 and 651 surrounding the first peripheral source blocks have pairs of scaling factors such as 621(x1, x2), 631(x2, x2), 643(x6, x2), 632(x2, x2), 622(x1, x2), 652(x1, x2), 642(x1, x6), 654(x1, x2), 624(x1, x2), 634(x2, x2), 644 (x6, x2), 633(x2, x2), 623(x1, x2), 653(x1, x2), 641(x1, x6)

and 651(x1, x2) arranged in a gradually decreased order from the pairs of scaling factors of first peripheral source blocks. The third peripheral source blocks 621, 622, 624 and 623 surrounding the second peripheral source blocks have pairs of scaling factors as 621(x1, x2), 622(x1, x2), 624(x1, x2) and 623(x1, x2) arranged in a gradually decreased order from the pairs of scaling factors of second peripheral source blocks.

Figure 8:
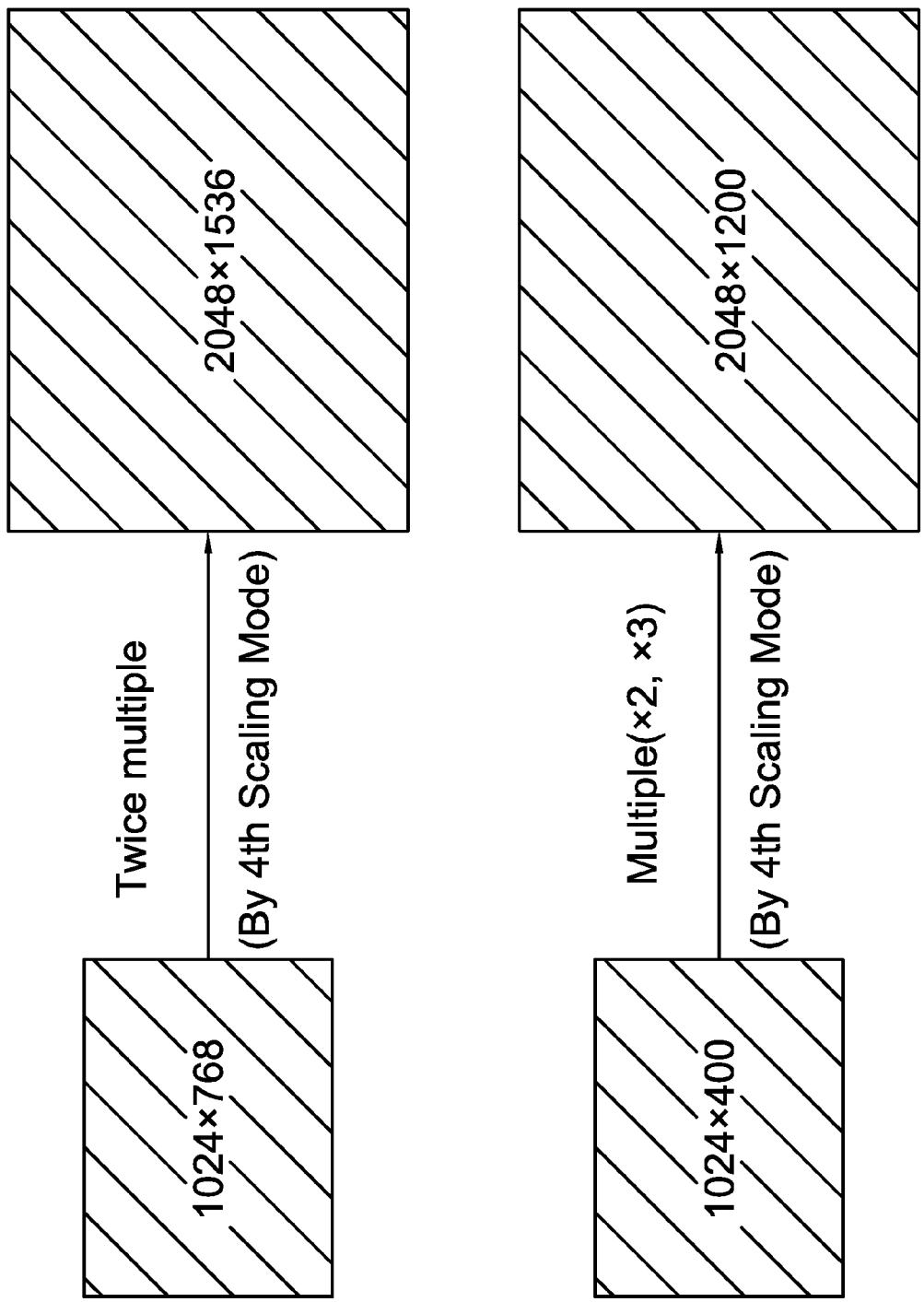
FIG. 8 is a diagrammatic sketch showing a scaled image from a source image with an integer multiple of scaling in the embodiment.

Besides, referred to FIG. 8, a source image converted to a display image by a scaling factor of an integer multiple through the fourth scaling mode is described herein. For example, when the source image having its resolution 1024×768 is converted to a display resolution having its resolution 2048×1536, the source image 1024×768 is upscaled by a pair of factors x2, x2 for twice multiple in horizontal and vertical directions so as to be displayed at the display resolution 2048×1536. When the source image having its resolution 1024×400 is converted to a display resolution having its resolution 2048×1200, the source image 1024×400 is upscaled by a pair of factors x2, x3 in horizontal and vertical directions so as to be displayed at the display resolution 2048×1200.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An image resolution adjustment method, for receiving a source resolution Vi from a source image and a display resolution Vo, comprising the steps of:
    performing a predetermined selection rule in a scaling phase to generate a scaling value set based on said source resolution Vi and said display resolution Vo for outputting a scaled image; and
    determining whether or not said scaled image is smoothed based on a variety of application requirements of display in a smoothing phase;
wherein said predetermined selection rule comprises:
    a first decision to determine whether or not a first scaling mode is selected based on said source resolution Vi and said display resolution Vo;
    a second decision to determine whether or not a second scaling mode is selected based on said source resolution Vi and said display resolution Vo; and
    a third decision to determine whether or not a third scaling mode is selected based on said source resolution Vi and said display resolution Vo;
wherein said first decision is set to TRUE if both conditions below are satisfied $$(Vo-Vi)<=(2*Vi),$$

and $$(Vo/Vi)=n, \text{ where } n \text{ is not an integer;}$$

wherein said second decision is set to TRUE if three conditions below are satisfied $$(Vo-Vi)>(2*Vi),$$

$$(Vo/Vi)=n, \text{ where } n \text{ is not an integer, and}$$

$$(7*Vi)>(2*Vo);$$

and wherein said third decision is set to TRUE if three conditions below are satisfied $$(Vo-Vi)>(2*Vi),$$

$$(Vo/Vi)=n, \text{ where } n \text{ is not an integer, and}$$

$$(7*Vi)<=(2*Vo).$$

2. An image resolution adjustment method according to claim 1, wherein said scaling value set includes a center resolution Vc, a sided resolution Vs and scaling factors corresponding to said center resolution Vc and said sided resolution Vs determined by the equations below in said scaling phase when said first decision is TRUE:

$$Vc=(Vo-Vi)/2,$$

and $$Vs=(3*Vi-Vo)/4,$$

where Vc and Vs are integers, respectively, and said scaling factors are equal to 1 and 3.

3. An image resolution adjustment method according to claim 2, wherein said sided resolution value Vs is selected from an upper sided resolution value Vs-up or a lower sided resolution value Vs-dn when Vs is not an integer, and wherein Vs-up is determined by the equation in said the smoothing phase:

$$Vs\text{-}up=(3*Vi-Vo)/4-0.5, \text{ and}$$

Vs-dn is determined by the equation:

$$Vs\text{-}dn=(3*Vi-Vo)/4+0.5.$$

4. An image resolution adjustment method according to claim 1, wherein said scaling value set includes a center resolution Vc, a sided resolution Vs and scaling factors corresponding to said center resolution Vc and said sided resolution Vs determined by the equations below when said second decision is TRUE:

$$Vs=(Vo-3*Vi)/2,$$

$$Vc=Vi-2*Vs=x+y,$$

and $$2*x+z*y=Vo-2*Vs,$$

where x, y>0 and z=3, 4, 5, . . . , respectively, and said scaling factors are equal to 1, 2, 3 or an integer greater than 3.

5. An image resolution adjustment method according to claim 1, wherein said scaling value set includes a center resolution Vc, a sided resolution Vs and scaling factors corresponding to said center resolution Vc and said sided resolution Vs determined by the equations below when said third decision is TRUE:

$$Vs=Vi/4,$$

where Vs is an integer multiple, and said center resolution Vc is determined by the two equations:

$$Vc=Vi-2*Vs=x+y,$$

and $$2*x+z*y=Vo-Vi$$

where x, y>0 and z=3, 4, 5, . . . , respectively, and said scaling factors are equal to 2, 3 or an integer greater than 3.

6. An image resolution adjustment method according to claim 5, wherein said sided resolution Vs is selected from an upper sided resolution Vs-up or a lower sided resolution value Vs-dn when Vs is not an integer, wherein Vs-up is determined by the equation:

$$Vs\text{-}up = Vi/4 - 0.5 \text{ and}$$

$Vs_{DN}$ is determined by the equation:

$$Vs\text{-}dn = Vi/4 + 0.5.$$

7. An image resolution adjustment method according to claim 1, wherein said predetermined selection rule further comprises a fourth decision to determine whether or not a fourth scaling mode is selected based on said source resolution Vi and said display resolution Vo.

8. An image resolution adjustment method according to claim 7, wherein said fourth scaling mode is set to TRUE if a condition below is satisfied $$(Vo/Vi) = n, \text{ when n is an integer multiple, and}$$

said scaling value set including a scaling factor equal to n.

9. An image resolution adjustment method according to claim 1, wherein said scaling value set is provided to generate replicated pixels for each pixel of said source image during a horizontal scaling period, and said replicated pixels are arranged in an axial symmetry in relation to its central region of said source image.

10. An image resolution adjustment method according to claim 1, wherein said scaling value set is provided to generate replicated lines for each line of said source image during a vertical scaling period, and said replicated lines are arranged in an axial symmetry in relation to its central region of said source image.

* * * * *